US007735476B2

(12) United States Patent
Carr et al.

(10) Patent No.: US 7,735,476 B2
(45) Date of Patent: Jun. 15, 2010

(54) VIRTUAL FUEL SENSOR FOR DUAL FUEL TANK APPLICATIONS

(75) Inventors: Mark D. Carr, Fenton, MI (US); Louis A. Avallone, Milford, MI (US); Julian R. Verdejo, Farmington, MI (US); Jeffrey A. Sell, West Bloomfield, MI (US); Shuanita Robinson, Romulus, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/016,394

(22) Filed: Jan. 18, 2008

(65) Prior Publication Data

US 2009/0071447 A1 Mar. 19, 2009

Related U.S. Application Data

(60) Provisional application No. 60/972,337, filed on Sep. 14, 2007.

(51) Int. Cl.
*F02M 37/04* (2006.01)

(52) U.S. Cl. ...................................... 123/495; 123/1 A

(58) Field of Classification Search ................. 123/495, 123/1 A, 406.3–406.33
See application file for complete search history.

(56) References Cited

U.S. PATENT DOCUMENTS 4,235,204 A * 11/1980 Rice ........................... 123/674
4,909,225 A * 3/1990 Gonze et al. ................ 123/494
5,094,214 A * 3/1992 Kotzan ....................... 123/479
5,172,655 A * 12/1992 Forgacs ...................... 123/1 A
5,400,762 A * 3/1995 Fodale et al. ................ 123/674
5,467,755 A * 11/1995 Konrad et al. ............... 123/674
5,845,620 A * 12/1998 Miyashita et al. ........ 123/406.3
5,881,703 A * 3/1999 Nankee et al. .............. 123/686
5,901,671 A * 5/1999 Huff et al. ................... 123/1 A
5,941,217 A * 8/1999 Cheng et al. ................ 123/494
6,000,384 A * 12/1999 Brown et al. ................ 123/676
6,257,174 B1 * 7/2001 Huff et al. ................... 123/1 A
6,575,147 B2 * 6/2003 Wulff et al. ................. 123/525
7,159,623 B1 * 1/2007 Carr et al. ..................... 141/94
7,526,374 B2 * 4/2009 Carr et al. ................... 701/104
2003/0075119 A1 * 4/2003 Huff et al. ................... 123/1 A
2008/0115768 A1 * 5/2008 Carr et al. ................... 123/479
2008/0234103 A1 * 9/2008 Jess et al. ................... 477/121
2009/0025695 A1 * 1/2009 Wolber et al. ............... 123/527
2009/0056430 A1 * 3/2009 Carr et al. ................ 73/114.54
2009/0064976 A1 * 3/2009 Carr et al. ................... 123/674

* cited by examiner

*Primary Examiner*—Stephen K Cronin
*Assistant Examiner*—David Hamaoui

(57) ABSTRACT

A method comprises detecting a status of a transfer pump for transferring fuel between a first fuel source and a second fuel source; receiving a fuel trim value and a vehicle operating parameter; and calculating a fuel composition of one of the first fuel source and second fuel source based on the fuel trim value, the transfer pump status and the vehicle operating parameter. A control module comprises a secondary pump transfer module detecting a status of a transfer pump for transferring fuel between a first fuel source and a second fuel source; and a fuel composition estimation module in communication with the secondary pump transfer module, receiving a fuel trim value and a vehicle operating parameter, and calculating a fuel composition of one of the first fuel source and second fuel source based on the fuel trim value, the transfer pump status, and the vehicle operating parameter.

18 Claims, 3 Drawing Sheets

Exhaust
28
Catalytic Converter
40
36
30
Secondary Fuel Reservoir
Control Module
24
22
Exhaust Manifold
16
12
38
42
Primary Fuel Reservoir
Fuel Injectors
Ignition
32
34
44
20
18
IM
14
10
26
Air

VIRTUAL FUEL SENSOR FOR DUAL FUEL TANK APPLICATIONS

CROSS-REFERENCE TO RELATED APPLICATIONS

This application claims the benefit of U.S. Provisional Application No. 60/972,337, filed on Sep. 14, 2007. The disclosure of the above application is incorporated herein by reference.

FIELD OF THE INVENTION

The present disclosure relates to fuel systems, and more particularly to methods and systems for determining the composition of fuel in fuel systems.

BACKGROUND OF THE INVENTION

The statements in this section merely provide background information related to the present disclosure and may not constitute prior art.

An engine may generate power by combusting an air and fuel mixture within cylinders of the engine. The fuel and air may be controlled such that the engine maintains an air-to-fuel ratio at stoichiometry. The engine may operate using fuels with different stoichiometric values, such as a gasoline and ethanol blend. As the percentage of each fuel in the overall fuel mixture changes, the stoichiometric value may change.

The stoichiometric value of a fuel mixture may be measured to allow for optimal operation of the engine based on the particular fuel mixture. The engine system may change the relative amounts of air and fuel delivered to the cylinders based on the stoichiometric value for the fuel mixture. In vehicles with a single fuel tank, the fuel mixture may undergo substantial change when the vehicle is refueled, as the new fuel introduced to the fuel tank may have a different fuel mixture than the fuel originally in the fuel tank. The new fuel composition may be measured by direct measurement using a hardware sensor.

The fuel mixture may also be calculated from other measured parameters and known relationships in a manner such as that described in commonly-assigned U.S. Pat. No. 7,159,623 (issued Jan. 9, 2007), the disclosure of which is incorporated herein by reference. Exhaust sensors such as oxygen sensors may measure the content of an exhaust flow from an engine. Based on measured values, the fuel and air supplied to the engine may be adjusted, i.e., trimmed, to correct for deviations from a desired air-to-fuel ratio. These fuel trim values may be stored in a memory structure such as a plurality of closed loop correction ("CLC") cells. The stored CLC values representing fuel trim over time may be used to calculate a fuel composition.

Some vehicles have more than one fuel source. Each fuel source may have a different fuel composition. The fuel sources may intermix during vehicle operation such that the fuel mixture supplied to the engine may change multiple times during normal vehicle operation rather than upon refueling.

SUMMARY OF THE INVENTION

A method comprises detecting a status of a transfer pump for transferring fuel between a first fuel source and a second fuel source; receiving a fuel trim value and a vehicle operating parameter; and calculating a fuel composition of one of the first fuel source and second fuel source based on the fuel trim value, the transfer pump status and the vehicle operating parameter.

A control module comprises a secondary pump transfer module detecting a status of a transfer pump for transferring fuel between a first fuel source and a second fuel source; and a fuel composition estimation module in communication with the secondary pump transfer module, receiving a fuel trim value and a vehicle operating parameter, and calculating a fuel composition of one of the first fuel source and second fuel source based on the fuel trim value, the transfer pump status, and the vehicle operating parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
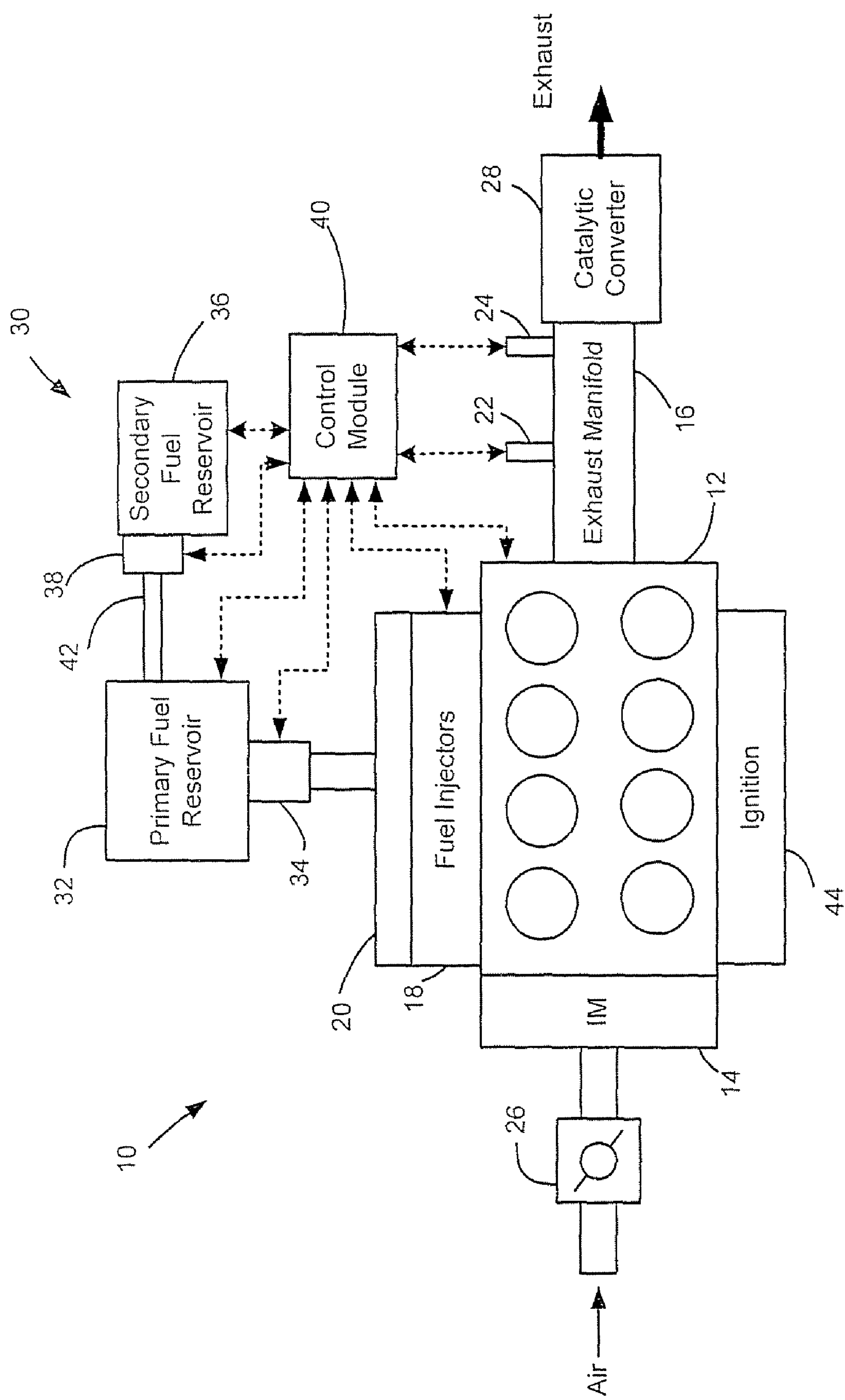
FIG. 1 is a functional block diagram of an exemplary vehicle.

The following description of the preferred embodiment(s) is merely exemplary in nature and is in no way intended to limit the invention, its application, or uses. For purposes of clarity, the same reference numbers may be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 is illustrated. The exemplary vehicle 10 includes engine 12, intake manifold 14, exhaust manifold 16, fuel injectors 18, fuel rail 20, exhaust sensors 22 and 24, throttle 26, catalytic converter 28, fuel system 30, control module 40 and ignition system 44. Fuel system 30 may include primary fuel reservoir 32, primary fuel pump 34, secondary fuel reservoir 36, secondary fuel pump 38, and balance pipe 42.

Primary fuel reservoir 32 and secondary fuel reservoir 36 may be connected by balance pipe 42. Balance pipe 42 may prevent primary fuel reservoir 32 from overflowing during refueling, and may balance the amount of fuel between primary fuel reservoir 32 and secondary fuel reservoir 36. Primary fuel reservoir 32 and secondary fuel reservoir may receive fuels of varied composition, such as fuels with varying percentages of ethanol. For example, "gasohol" may be composed of 90 percent gasoline and 10 percent ethanol and "E85" may be composed of 85 percent ethanol and 15 percent gasoline. Although ethanol and gasoline may be mentioned for example purposes, it should be recognized that other fuels may be used.

Primary fuel pump 34 and secondary fuel pump 38 may be fixed displacement pumps or variable displacement pumps. Secondary fuel pump 38 may provide fuel from secondary fuel reservoir 36 to primary fuel reservoir 32. For example, secondary fuel pump 38 may provide fuel to primary fuel reservoir 32 when primary fuel reservoir 32 is depleted to a certain level. This depletion may occur because primary fuel pump 34 provides pressurized fuel to fuel rail 20 which is drawn from primary fuel reservoir 32. As fuel injectors 18 inject fuel into the respective cylinders of engine 12, primary fuel pump 34 may replenish the pressurized fuel within fuel rail 20.

Fuel may be delivered to cylinders of engine 12 from primary fuel reservoir 32 by primary fuel pump 34 through fuel rail 20 and a plurality of fuel injectors 18. Air may be drawn into intake manifold 14 through throttle 26 and distributed to cylinders of engine 12. The air and fuel may mix to form a combustion mixture within cylinders of engine 12 which may be ignited by ignition system 44. The combustion mixture may be provided at a desired stoichiometric ratio of air and fuel and may combust within the cylinder to reciprocally drive a piston (not shown) of engine 12, which in turn may drive a crankshaft (not shown) of engine 12. The fuel and air may be adjusted, or trimmed, to correct for deviations from a desired stoichiometric air-to-fuel ratio.

Exhaust gas from combustion within engine 12 may exit engine 12 through exhaust manifold 16. Exhaust sensors 22 and 24 may be oxygen sensors associated with a cylinder bank of engine 12. Exhaust sensors 22 and 24 may sense whether the exhaust is lean or rich and may be monitored by control module 40. The output of exhaust sensors 22 and 24 may be used to control trim values, which in turn may provide information to calculate a fuel composition.

Control module 40 may be in communication with engine 12, fuel injectors 18, exhaust sensors 22 and 24, primary fuel reservoir 32, primary fuel pump 34, secondary fuel reservoir 36 and secondary fuel pump 38. Control module 40 may monitor fuel levels of primary fuel reservoir 32 and secondary fuel reservoir 36. Control module 40 may monitor and control primary fuel pump 34 and secondary fuel pump 38, including monitoring an ON or OFF status. Control module 40 may monitor exhaust sensors 22 and 24 to receive signals relating to exhaust content. Control module 40 may control engine 12 and fuel injectors 18 at a fuel trim level based on exhaust sensors 22 and 24. Control module 40 may include memory and algorithms such that changes in fuel trim may be used to estimate relative changes in stoichiometric air-to-fuel or fuel-to-air ratio and, accordingly, to estimate relative changes in fuel composition.

Figure 2:
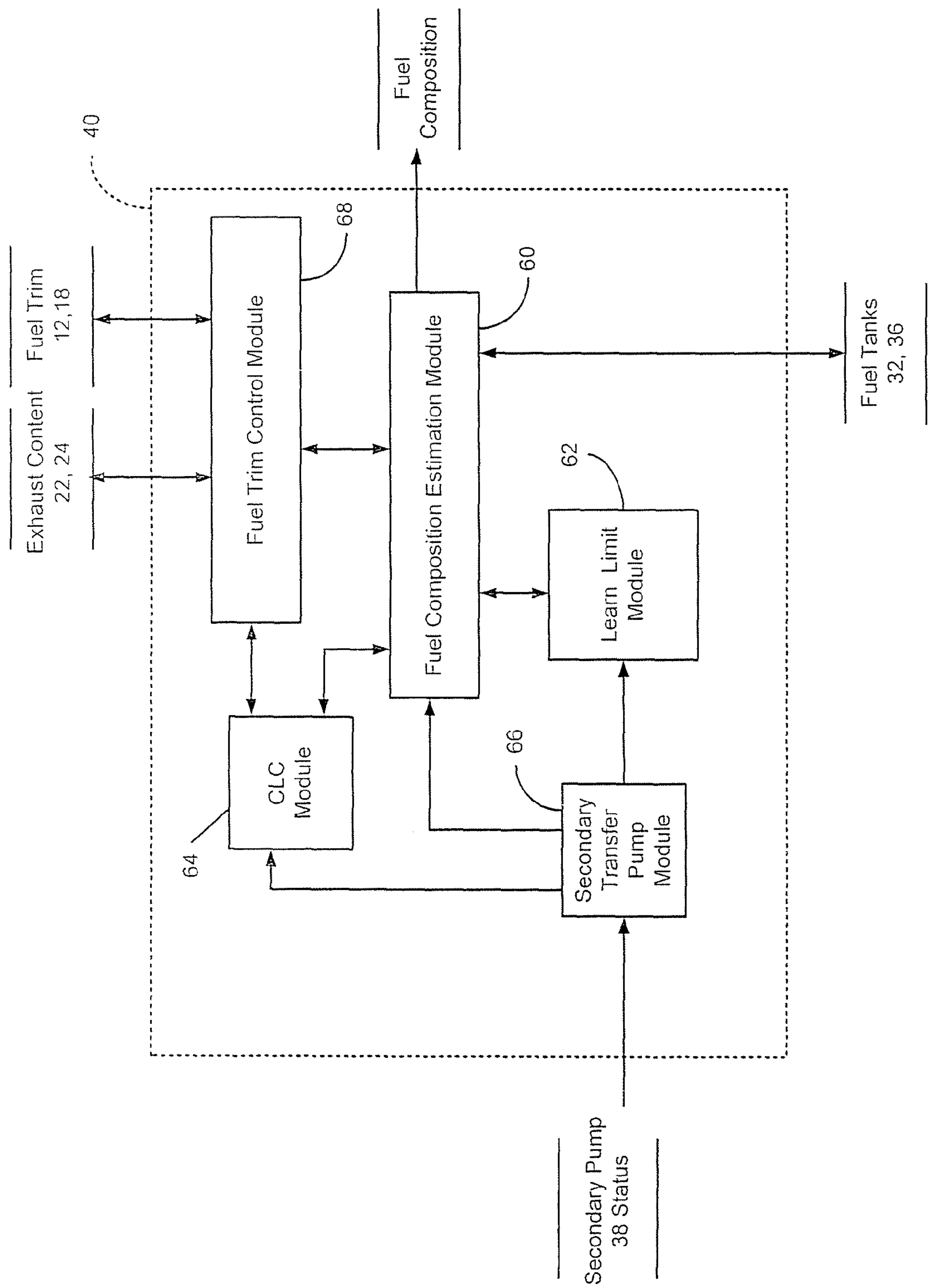
FIG. 2 is a functional block diagram of a control module of the exemplary vehicle.

Referring now to FIG. 2, a functional block diagram of control module 40 is shown. Control module 40 may include fuel composition estimation module 60, learn limit module 62, CLC module 64, secondary transfer pump module 66 and fuel trim control module 68.

Fuel trim control module 68 may be in communication with fuel composition estimation module 60, CLC module 64, exhaust sensors 22 and 24, engine 12 and fuel injectors 18. Fuel trim control module 68 may monitor exhaust sensors 22 and 24 for an exhaust composition such as oxygen to determine whether engine 12 is being operated with a stoichiometric mixture of air and fuel. Fuel trim control module 68 may trim the fuel supplied to engine 12 by fuel injectors 18 to achieve stoichiometry.

Trim values used to make such corrections may be stored in memory locations of fuel trim control module 68 corresponding to a plurality of predefined closed loop air-to-fuel ratio control cells (also referred to as sub-regions) associated with operating regions of vehicle 10. Cell values may be used to provide closed-loop fuel, air and/or re-circulated exhaust control. For example, long-term multipliers (LTMs) may be used to provide long-term corrections to fuel commands to engine 12 in response to changing engine conditions. LTMs typically are stored in a memory lookup table in non-volatile memory. The fuel trim control module 68 may adjust LTMs periodically in accordance with a long-term time period, e.g., using a period that is longer than 1 second such as ten seconds. Such adjustment may be referred to as "long-term learning".

Additionally or alternatively, short-term integrators (STIs) may be used to provide short-term corrections to fuel commands to the engine 12 in response to engine conditions. The fuel trim control module 68 may adjust STIs periodically in accordance with a short-term time period, e.g., using a period that is less than one second such as every 6.25 milliseconds. Such adjustment may be referred to as "short-term learning". STIs may be stored in volatile memory and may be adjusted based on an active cell LTM and a signal of exhaust sensors 22 and 24. Fuel trim control module 68 may communicate fuel trim values (including STI and LTM values) to fuel composition estimation module 60 and CLC module 64.

CLC module 64 may receive fuel trim values from fuel trim control module 68 or fuel composition estimation module 60. CLC module 64 may include a fuel trim memory structure for use in estimating fuel composition. A plurality of CLC cells may be associated with each cylinder bank of engine 12. For example, eight cells may be provided for each cylinder bank of engine 12. CLC cells may be defined based on mass air flow to the engine 12 and may be used to record a total closed-loop fuel trim of the engine 12 at various operating conditions. CLC module 64 may store baseline closed loop correction values for the engine operating regions in the CLC cells. The baseline CLC values may provide a basis for determining new fuel and air ratio estimates.

CLC cell values may be stored in non-volatile memory. A CLC value may be obtained by multiplying LTM and STI corrections for an active closed-loop fuel control cell. In other configurations, CLC values may be combined in other ways. For example, a CLC value may be obtained in another configuration by adding LTM and STI corrections for an active closed-loop fuel control cell. CLC module 64 may use separate structures for closed loop fuel control and for fuel composition estimation or may use a single data structure for both operations. CLC module 64 may be in communication with secondary transfer pump module 66. Based on the input from secondary transfer pump module 66, CLC module 64 may not calculate or adjust CLC values.

Learn limit module 62 may be in communication with secondary transfer pump module 66 and fuel composition estimation module 60. As will be described below, fuel composition estimation module 60 may utilize a change in fuel trim values over time to estimate fuel composition. Learn limit module 62 may use a change in volume of fuel in a fuel tank to set maximum and minimum boundaries for the fuel trim valves that may be considered by fuel composition estimation module 60. For example, where a small volume of fuel has been added to a fuel tank, the overall change in fuel composition may be small even if the fuel composition of the added fuel is different from the fuel in the fuel tank. Conversely, when a large volume of fuel has been added, a greater change in overall fuel composition is possible. By setting fuel composition estimation learn limits based on the change in fuel volume, learn limit module 62 serves to filter air, fuel and other faults out of the fuel composition estimation calculations of fuel compensation estimation module 60. Learn limit module 62 may be disabled based on communication from secondary transfer pump module 66.

Secondary transfer pump module 66 may be in communication with secondary pump 38 to receive a secondary pump status such as OFF or ON. Secondary transfer pump module 66 may monitor the secondary pump status and based on the secondary pump status communicate with fuel composition estimation module 60, learn limit module 62 and CLC module 64.

Fuel composition estimation module 60 may be in communication with learn limit module 62, CLC module 64, secondary transfer pump module 66, fuel trim control module 68, primary fuel reservoir 32 and secondary fuel reservoir 36. Learn limit module 62 and fuel composition estimation module 60 may communicate fuel volumes, fuel composition measurements and fuel composition limits back and forth. Fuel composition estimation module 60 may receive CLC values from CLC module 64 and may provide fuel trim values to be stored in CLC module 64. Fuel composition estimation module 60 may receive a transfer pump status from secondary transfer pump module 66, fuel trim values from fuel trim control module 68, and fuel reservoir measurements from primary fuel reservoir 32 and secondary fuel reservoir 36. Fuel composition estimation module 60 may utilize these and other parameters to calculate a fuel composition as will be described in more detail below.

Figure 3:
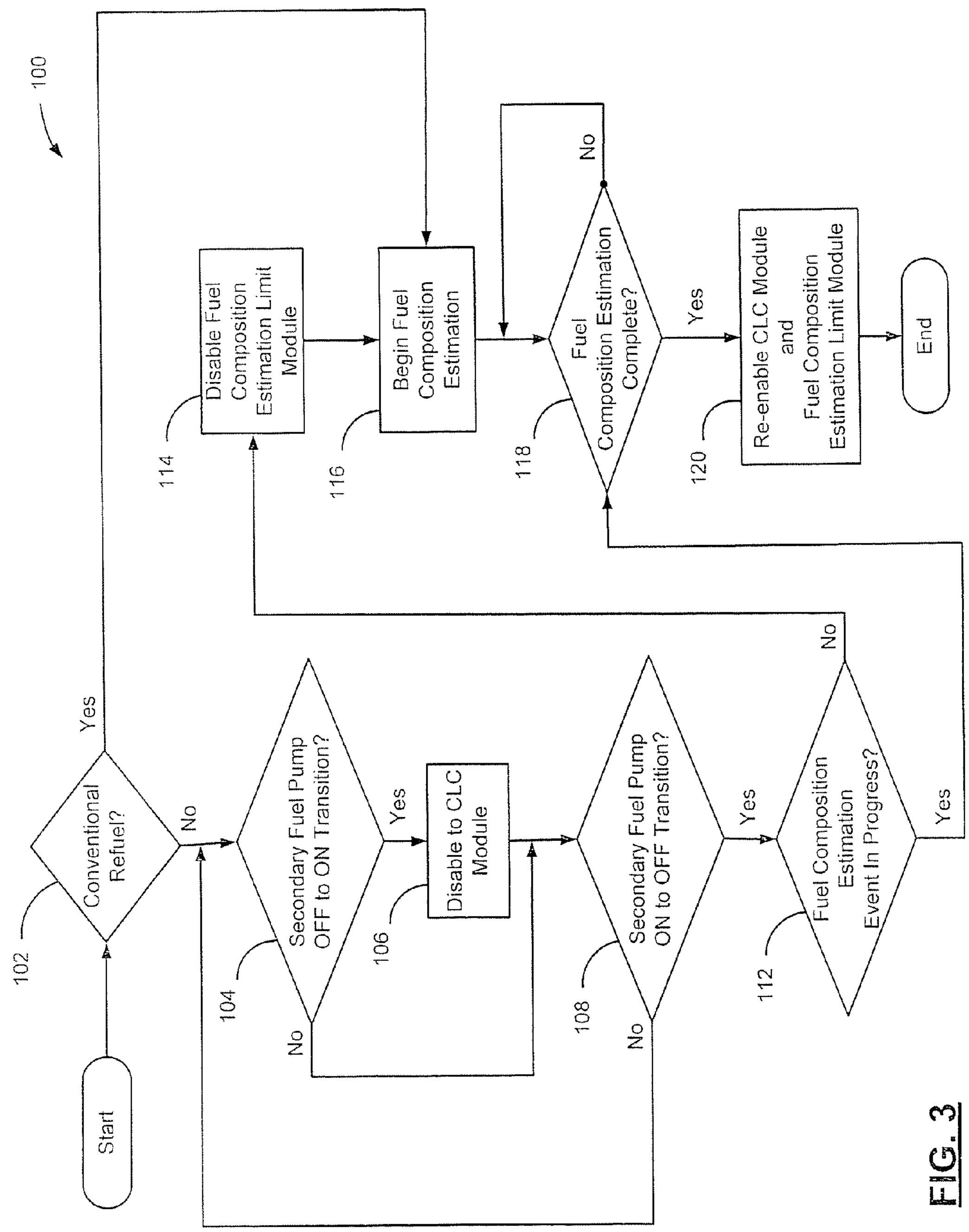
FIG. 3 is a flowchart illustrating the operation of a virtual fuel sensor for dual fuel tank applications.

Referring now to FIG. 3, a flowchart illustrating the operation of the control system is shown as control logic 100. At block 102 fuel composition estimation module 60 may determine whether a conventional refueling event has occurred. A conventional refueling event occurs while the vehicle 10 is turned off and fuel is added to the primary fuel reservoir 32. Fuel composition estimation module 60 may monitor the vehicle 10 ignition (not shown) or other parameters to determine whether the vehicle 10 was turned off and may monitor the primary fuel reservoir 32 to determine whether fuel was added while vehicle 10 was off. If a conventional refuel has occurred, control logic 102 may continue to block 116. If a conventional refuel has not occurred, control logic 100 may continue to block 104.

At block 104, secondary transfer pump module 66 may determine whether secondary fuel pump 38 has transferred from OFF to ON. An OFF to ON transition indicates that secondary fuel pump 38 is transferring fuel from secondary fuel reservoir 36 to primary fuel reservoir 32. The fuel transferred from secondary fuel reservoir 36 may have a different fuel composition than the fuel already in primary fuel reservoir 32. If secondary fuel pump 38 indicates an OFF to ON transition, control logic 100 may continue to block 106. If secondary fuel pump 38 does not indicate an OFF to ON transition, control logic 100 may continue to block 108.

At block 106, secondary transfer pump module 66 may provide a signal to CLC module 64 indicating that certain CLC functions should be disabled. For example, CLC baseline values may not be updated once secondary fuel pump 38 begins to transfer fuel to primary fuel reservoir 32, although current CLC values may still be used by fuel trim control module 68 and fuel composition estimation module 60. It should be recognized that the disabling function described above may be applied to any operating parameters of vehicle 10, such as stored CLC values, that may operate under the assumption that large changes in fuel composition only occur during a conventional refueling event. Updating these parameters during a fuel transfer may result in skewed calculations and/or operation of vehicle 10. Control logic 100 may continue to block 108.

At block 108, secondary transfer pump module 66 may determine whether secondary fuel pump 38 has transferred from ON to OFF. An ON to OFF transition indicates that secondary fuel pump 38 has finished transferring fuel from secondary fuel reservoir 36 to primary fuel reservoir 32. If secondary fuel pump 38 indicates an ON to OFF transition, control logic 100 may continue to block 112. If secondary fuel pump 38 does not indicate an ON to OFF transition, control logic 100 may return to block 104.

At block 112, fuel composition estimation module 60 may receive a signal from secondary transfer pump module 66 indicating that secondary transfer pump 38 has transferred from ON to OFF. Fuel composition estimation module 60 may determine whether a fuel composition estimation is already in progress. If so, control logic 112 may continue to block 118 and loop until the fuel composition estimate is complete as will be described below. If a fuel composition estimation is not already in progress, control logic 100 may continue to block 114.

At block 114, secondary transfer pump module 66 may provide a signal to fuel composition estimation module 60 and/or learn limit module 62 indicating that the fuel composition learn limits should not be utilized by fuel composition estimation module 60 to determine the fuel composition of primary fuel reservoir 32 after secondary fuel pump 38 has transferred fuel from secondary fuel reservoir 36. Utilizing fuel composition learn limits during fuel transfer may result in the exclusion of valid fuel trim values from the fuel composition estimation calculations. It should be recognized that the disabling function described above may be applied to any operating parameters of vehicle 10, such as fuel composition learn limits, that operate under assumptions that are not applicable to an active refueling event during vehicle operation. Control logic 100 may continue to block 116.

At block 116, fuel composition estimation module 60 may begin estimating the fuel composition of primary fuel reservoir 32. Fuel trim control module 68 will continue to trim the fuel supplied to engine 12 to maintain stoichiometry even as the fuel composition changes. Fuel trim changes may in turn be represented as CLC values as described above and compared to CLC baseline values during learn stages that occur at predetermined intervals. The predetermined intervals may be based on fuel consumption from primary fuel reservoir 32 as measured by fuel composition estimation module 60. The ratio of the current CLC value to the CLC baseline provides a percentage change in the fuel-to-air ratio. The fuel composition may be determined from the fuel-to-air ratio based on correlating between fuel composition stoichiometric ratios.

At block 118, fuel composition estimation module 60 may determine if the fuel composition estimation is complete. Fuel composition estimation may be complete when a predetermined number of learn stages are successfully completed or if a predetermined number of learn stages result in the same fuel composition. If fuel composition estimation is not complete, control logic 100 may continue to loop back to block 118. If fuel composition estimation is complete, control logic 100 may continue to block 120.

At block 120, fuel compensation estimation module 60 may communicate to learn limit module 62 and CLC module 64 that fuel composition estimation is complete. Learn limit module 62 and CLC module 64 may then re-enable fuel composition estimation learn limits and updating of CLC baseline values, as well as any other parameters that may have been disabled by control logic 100. Control logic 100 may then end.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method, comprising:

detecting a status of a transfer pump in a vehicle for transferring fuel from a first fuel source in the vehicle to a second fuel source in the vehicle;

receiving a fuel trim value and at least one vehicle operating parameter;

calculating a fuel composition of the second fuel source based on the fuel trim value, the transfer pump status and the at least one vehicle operating parameter;

storing the fuel composition to generate a record of fuel composition, wherein the at least one vehicle operating parameter comprises a fuel composition learn limit;

disabling a module that sets the at least one vehicle operating parameter based on the transfer pump status; and calculating the fuel composition based on the fuel trim value and not the at least one vehicle operating parameter when the module is disabled.

2. The method of claim 1, wherein the disabling of the module includes disabling updating of baseline closed loop correction cells.

3. The method of claim 2, further comprising enabling the disabled module that sets the at least one vehicle operating parameter when the transfer pump status includes a transition from ON to OFF.

4. The method of claim 1, further comprising:

enabling the module after the calculating of the fuel composition; and then calculating a fuel composition of the at least one of the first fuel source and the second fuel source based on the vehicle operating parameter.

5. The method of claim 1, further comprising:

enabling use of fuel composition learn limits when at least one of the calculating of the fuel composition is complete and the status of the transfer pump transitions from ON to OFF; and enabling updating of closed loop correction values when at least one of the calculating of the fuel composition is complete and the status of the transfer pump transitions from ON to OFF, wherein the calculating of the fuel composition is based on the fuel composition learn limits and the closed loop correction values.

6. The method of claim 5, wherein the calculating of the fuel composition is complete when a predetermined number of learn stages are completed.

7. The method of claim 5, wherein the calculating of the fuel composition is complete when a first learn stage generates a first fuel composition result that is equal to a second fuel composition result of a second learn stage.

8. The method of claim 1, further comprising:

disabling use of fuel composition learn limits when the vehicle is ON and the status of the transfer pump transitions from OFF to ON; and disabling updating of closed loop correction values when the vehicle is ON and the status of the transfer pump transitions from OFF to ON.

9. The method of claim 1, comprising:

calculating a first fuel composition value during a first refueling event when the second fuel source is refueled from a third fuel source that is external to the vehicle;

detecting a status of a transfer pump that is in the vehicle and that transfers fuel from the first fuel source to the second fuel source; and when the first fuel source is not refueled from the third fuel source and the status of the transfer pump is in a first state:

disabling a closed loop correction (CLC) module;

disabling a fuel composition estimation limit module when state of the transfer pump changes to a second state; and calculating a second fuel composition estimation value during a second refueling event based on a state of the CLC module and a state of the fuel composition estimation limit module.

10. The method of claim 9, further comprising enabling the CLC module and the fuel composition estimation limit module when the calculating of the second fuel composition estimation value is complete.

11. The method of claim 9, further comprising calculating a third fuel composition estimation value based on a fuel trim value, a CLC value, and a fuel composition estimation limit when the first fuel source is not refueled and the transfer pump is in the second state.

12. The method of claim 9, comprising disabling the fuel composition estimation limit module based on a fuel composition estimation event when the first fuel source is not being refueled and the status of the transfer pump is in one of the first state and the second state.

13. A system for a vehicle, the system comprising:

a transfer pump that transfers fuel from a first fuel source to a second fuel source, wherein the first fuel source and the second fuel source are in the vehicle; and a control module comprising:

a secondary pump transfer module is configured to detect a status of the transfer pump; and a fuel composition estimation module is configured to: communicate with the secondary pump transfer module; receive a fuel trim value and at least one vehicle operating parameter that includes a fuel composition learn limit; and calculate a fuel composition of one of the first fuel source and second fuel source based on the fuel trim value, the transfer pump status, and the at least one vehicle operating parameter, wherein the fuel composition estimation module is configured to calculate the fuel composition based on the fuel trim value and not the at least one vehicle operating parameter when a module, which sets the at least one vehicle operating parameter based on the transfer pump status, is disabled.

14. The system of claim 13, further comprising a learn limit module that sets the fuel composition learn limit, wherein the learn limit module is disabled based on the transfer pump status.

15. The system of claim 14, wherein the fuel composition estimation module enables the learn limit module when the calculating is complete.

16. The system of claim 13, further comprising a closed loop correction (CLC) module including baseline CLC cells, wherein the CLC module disables updating of the baseline CLC cells.

17. The system of claim 16, wherein the CLC module enables updating of the baseline CLC cells when the transfer pump status includes a transition from ON to OFF.

18. A method comprising:

detecting a status of a transfer pump in a vehicle for transferring fuel from a first fuel source in the vehicle to a second fuel source in the vehicle;

receiving a fuel trim value and at least one vehicle operating parameter;

calculating a fuel composition of the second fuel source based on the fuel trim value, the transfer pump status and the at least one vehicle operating parameter;

storing the fuel composition to generate a record of fuel composition, wherein the at least one vehicle operating parameter comprises a fuel composition learn limit, wherein the calculating of the fuel composition is performed independent of fuel composition learn limits after a transfer of fuel from the first source to the second fuel source, and wherein the fuel composition learn limits are determined before the transfer of the fuel from the first fuel source to the second fuel source.

* * * * *